Feb. 12, 1924.
1,483,386
C. L. SCHWARTZ
IRONER
Filed Nov. 23, 1921
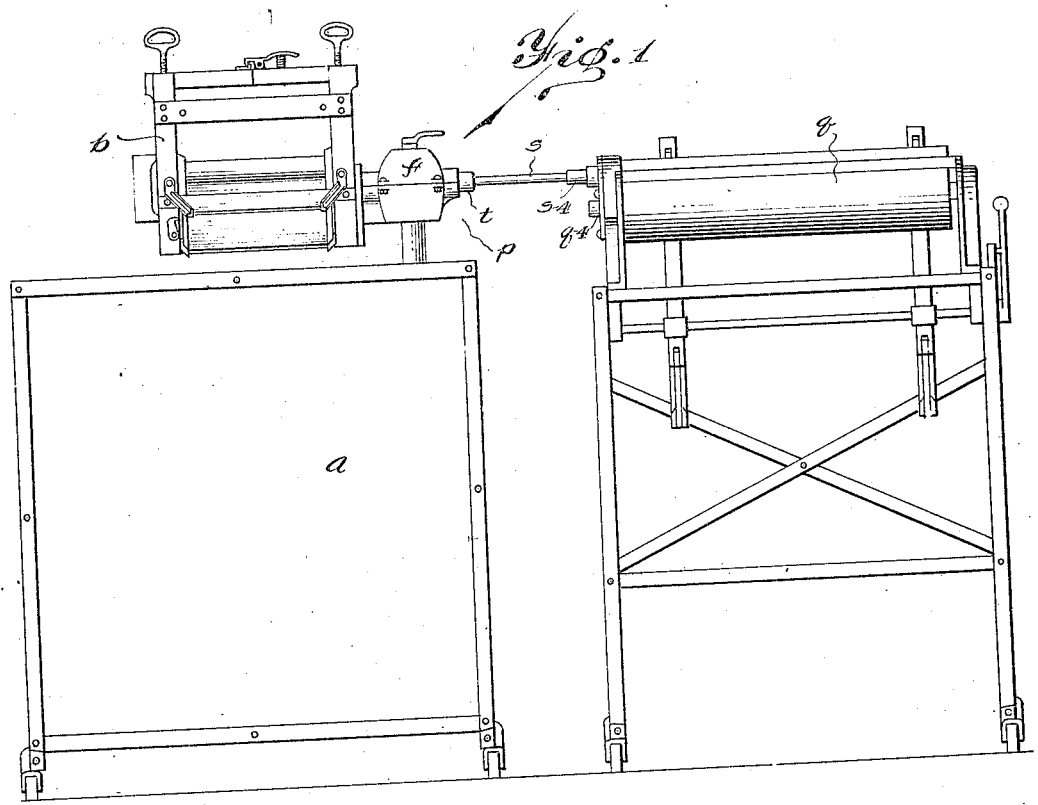
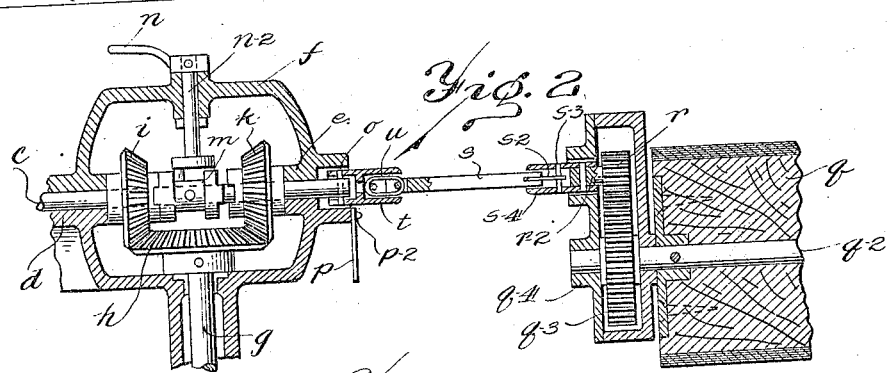
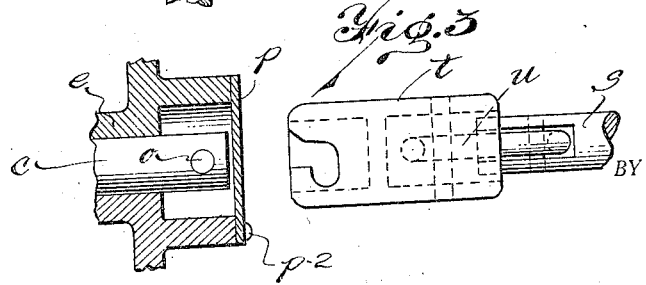
INVENTOR.
Chester L. Schwartz.
BY Ralph J. Burton
ATTORNEY.

Patented Feb. 12, 1924.

1,483,386

UNITED STATES PATENT OFFICE.

CHESTER L. SCHWARTZ, OF ITHACA, MICHIGAN, ASSIGNOR OF ONE-HALF TO JULES H. KRAUS, OF DETROIT, MICHIGAN.

IRONER.

Application filed November 23, 1921. Serial No. 517,172.

*To all whom it may concern:*

Be it known that I, CHESTER L. SCHWARTZ, a citizen of the United States, residing at Ithaca, in the county of Gratiot and State of Michigan, have invented certain new and useful Improvements in Ironers, of which the following is a specification.

My invention relates to improvements in ironers and particularly to improvements in power driven wringers and ironers and their driving connections.

An object is to provide in combination with a power driven wringer and ironer, connecting means whereby the ironer may be engaged with the wringer driving mechanism to be driven therefrom.

A further object is to provide simple, detachable mechanism through the use of which the ironer may be easily and quickly engaged with the wringer driving mechanism to be driven therefrom, and easily and quickly uncoupled therefrom.

A further object is to provide in combination with a power driven ironer and wringer a universal coupling connection by means of which the ironer may be coupled with the wringer during the running thereof so the ironer will run concurrently therewith, which coupling connection will automatically uncouple when the direction of rotation of the wringer is reversed.

A further object is to provide with the standard drive gear mechanism for a power driven wringer, a clutch member on an exposed end of a gear shaft of said mechanism, which clutch member is adapted to be engaged by a clutch member carried by a coupling shaft engaging the ironer so that the ironer may be driven therefrom, and means for quickly and easily releasing the same from its driven engagement.

These and other objects, together with details of construction will more fully appear from the following description, appended claim and accompanying drawing, in which:

Fig. 1 is an elevation of the combined ironer and wringer engaged for concurrent driving.

Fig. 2 is an enlarged section through the gear and coupling mechanism.

Fig. 3 is an elevation of the coupling, partly in section, showing the parts disconnected.

In the drawing, let $a$ indicate any conventional type of washing machine, provided with a swinging wringer $b$ having power driving means, furnished from some suitable source, such as an electric motor, not shown in the drawing. The driving shaft which leads to the wringer is indicated as $c$, and has a bearing at $d$ and $e$ in the gear casing $f$. There is a main driving shaft $g$ leading from a suitable source of power supply, which carries at its upper end, mounted within the gear casing, a bevel gear $h$. Loosely mounted on the shaft $c$ are opposed bevel gears $i$ and $k$, constantly in mesh with driven gear $h$ to be rotated therefrom. I provide a conventional clutch mechanism in the form of a sliding clutch member $m$ keyed on the shaft $c$, provided at opposite ends with engaging jaw clutches, adapted to engage the respective bevel gears $i$ and $k$, which are likewise provided with jaw clutches, to lock either of the gears to the shaft $c$ to rotate therewith. This clutch is manually actuated by means of a handle $n$, which is carried by a shaft $n^2$ provided at its lower end with an eccentric operating in a recess formed in the clutch member so as to reciprocate the clutch member when the handle is rotated. This is a well known form of construction and provides for reversible rotation of the shaft $c$.

The shaft $c$ extends through the casing wall and is provided at the free end with a transverse pin $o$, adapted to engage a cooperating clutch member carried by the connecting shaft $s$, which is engaged with the ironer as hereinafter described. This exposed end of the shaft is provided with an open end housing formed as a part of the gear casing, the open end of which is provided with a closure plate $p$, pivoted as at $p^2$ to the casing. In Fig. 2 it is shown open and closed in Fig. 3.

The ironer embodies the well known features of roller and movable shoe. The roller is indicated as $q$ and is mounted on a shaft $q^2$, which is provided with a driving gear $q^3$ at one end, and has a bearing in the casing $q^4$. This gear $q^3$ is in constant engagement with a driving gear $r$, mounted on a spindle $r^2$ which likewise has a bearing for rotation in the casing $q^4$.

I provide a type of universal coupling mechanism in the form of a shaft $s$ coupled to the spindle $r^2$ to drive the same by means of a link $s^2$, engaging the shaft $s$ and a transverse pin $s^3$ carried by the sleeve $s^4$, which is secured to the shaft $r^2$.

At the opposite end the shaft $s$ carries a pivoted clutch sleeve $t$, secured to the shaft $s$ by means of a link $u$, and provided with opposed recesses adapted to engage the transverse pin $o$, after the fashion of a bayonet joint, so the shaft $s$ and the shaft $c$ will rotate together, when the shaft $c$ is rotating in the forward direction. By virtue of the form of connection between the pin $o$ and the clutch member $t$, it is obvious that when the direction of rotation is reversed, the parts will automatically disengage.

When the wringer is being driven, and it is desired to use the ironer, the sleeve clutch member may be inserted over the end of the shaft $c$ and if shaft $c$ is travelling in a counter-clockwise direction the pin $o$ will engage in the curved recesses in the sleeve $t$ and the ironer will be driven concurrently with the wringer. It will be apparent that this form of connection between the pin $o$ and the sleeve clutch member is of such a character that the sleeve will not become disengaged from the shaft $c$ when the shaft is rotating in a given direction, as it is locked against such disengagement and could not be drawn away without first being reversibly rotated to permit disengagement. It will not be necessary to stop the wringer to disengage the ironer, if it is desired to run the wringer alone, as all that will be necessary is to reverse the rotation of the shaft $c$, causing the wringer to travel in an opposite direction, when the pin $o$ will automatically disengage from the connection $t$.

By means of the universal character of the connecting mechanism, the ironer will align itself with the wringer to compensate for all slight differences in alignment, without truing the wringer and ironer up with each other.

What I claim is:

The combination with a power driven shaft journaled for reversible rotation and having at the free end a transversely extending lock pin, and a second shaft journaled for rotation, of a coupling engaging the second shaft to the first shaft to rotate therewith, said coupling comprising a shaft section at each end of which is secured a socket by means of a link loosely pivoted at one end to the shaft section and at the opposite end to the socket, one of said sockets provided with angularly extending grooves adapted to receive the lock pin carried by said first shaft to lock the socket thereto to rotate in one direction with the shaft and adapted to disengage from the shaft when rotated in the opposite direction.

CHESTER L. SCHWARTZ.